3,489,800
ELECTRON-DONOR CHROMOGENIC BIS(p-DIAL-
KYLAMINOARYL)METHYL THIOL ETHERS
Floyd L. Tewksbury, Jr., Eggertsville, Raymond B. Craw-
ford, Hamburg, and Audley L. Cain, Amherst, N.Y.,
assignors to Allied Chemical Corporation, New York,
N.Y., a corporation of New York
No Drawing. Filed Jan. 25, 1966, Ser. No. 522,828
Int. Cl. C07c 93/00; C09b 11/02
U.S. Cl. 260—570                                  13 Claims

ABSTRACT OF THE DISCLOSURE

Electron-donor chromogenic organic thio ethers of the formula

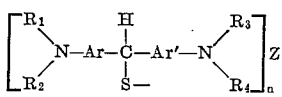

in which $R_1$, $R_2$, $R_3$ and $R_4$ are lower alkyl radicals;
Ar and Ar′ are aryl radicals selected from the group consisting of 1,4-phenylene radicals and substituted 1,4-phenylene radicals;
$n$ is the valance of Z and is an integer 1 to 2;
and Z is an organic radical which is the residue of an organic thiol, there being no more than one bis-(p-dialkylaminoaryl)methyl radical per sulfur atom, are provided which yield intense, fast colorations on contact with acidic materials, are non-staining to textile fabrics and are substantially colorless when dissolved in aqueous, non-acidic organic compounds.

---

The present invention relates to a novel class of chromogenic organic compounds and more particularly to novel electron-donor chromogenic compounds. It is especially concerned with novel electron-donor chromogenic cmpounds which yield intense, fast colorations on contact with acidic materials and are non-staining to textile fabrics in the presence or absence of water and substantially colorless when dissolved in aqueous non-acidic polar organic compounds.

Covalent derivatives of bis-(p-dialkylaminophenyl) methane such as those in which the oxygen atom of a hydroxy radical or an alkoxy radical replaces a methane hydrogen atom, e.g., 4,4′-bis(dialkylamino)benzhydrol (Michler's hydrol) or the alkyl ethers thereof, are known electron-donor chromogenic compounds, i.e. they are colorless or substantially colorless compounds which turn blue or bluish violet on contact with acidic electron-acceptor materials such as acidic clay, e.g. attapulgite. The aforementioned electron-donor chromogenic compounds have been widely used as color precursors in thermographic reproduction compositions, electrographic reproduction compositions and particularly in pressure sensitive duplicating systems and reproduction compositions for example in pressure sensitive transfer and copy paper of the type disclosed in U.S.P. 3,079,271. Such compounds have the undesirable property of staining textile fabrics, e.g., fabrics of polyhexamethylene adipamide (nylon 6,6), polyacrylonitrile (Orlon) and particularly cotton and other cellulosic materials, especially in the presence of water. In order to overcome the latter disadvantage U.S. Patent 3,193,404 has proposed 4,4′-bis-(dialkylamino)benzhydryl salts of aromatic and aliphatic sulfinic acids as color precursor compounds which do not stain cotton and other textile fabrics even in the presence of water. The latter salts, however, generate intense blue colorations when dissolved in aqueous non-acidic polar organic solvents, e.g. aqueous ethyl alcohol and acetone, and, hence can not be employed in duplicating media and compositions which require substantially colorless aqueous organic solutions of the color precursor. Moreover, anhydrus solutions of 4,4′-bis(dialkylamino)benzhydryl sulfinates in organic, non-acidic, water miscible solvents such as ethyl alcohol readily stain cotton and other cellulosic fabrics, which even when dry, retain considerable moisture within their fibers, e.g. up to about 15 weight percent water based on the weight of the fabric.

It is the principal object of this invention to devise novel electron-donor chromogenic organic compounds.

It is another object of this invention to devise novel electron-donor chromogenic compounds which are non-staining to textile fabrics in the presence or absence of water.

It is a still further object of the invention to provide novel electron-donor chromogenic compounds which remain substantially colorless when dissolved in aqueous non-acidic polar organic solvents.

These and other objects and advantages of our invention will be apparent from the following description of the invention.

The aforementioned disadvantages of prior art compounds are avoided and the above objects and advantages are attained in the preparation of the novel compounds of the invention which are thioethers corresponding to the structural formula:

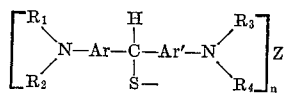

in which $R_1$, $R_2$, $R_3$ and $R_4$ are lower alkyl radicals, i.e. alkyl radicals of 1 to 5 carbon atoms. Preferably $R_1$, $R_2$, $R_3$ and $R_4$ are methyl or ethyl radicals;
Ar and Ar′ are aryl radicals selected from the group consisting of 1,4-phenylene radicals and substituted 1,4-phenylene radicals. Preferably, Ar and Ar′ are 1,4-phenylene radicals;
$n$ is the valence of Z and is an integer 1 to 2, preferably $n$ is 1, and Z is an organic radical, there being no more than one bis(p-dialkylaminoaryl) methyl radical per sulfur atom.

The mono or divalent organic radicals represented by Z are derived from the organic thiol reactant employed in the preparation of the novel thioethers of the invention and include such radicals as (a) Aliphatic radicals and substituted derivatives thereof such as alkyl, aroxyalkyl, alkoxyalkyl, carbalkoxyalkyl, dialkylaminoalkyl, haloalkyl, aralkyl, alkoxyaralkyl, etc.

(b) Mono and bicyclic cycloaliphatic radicals and substituted derivatives thereof such as cycloalkyl, bicycloalkyl, halocycloalkyl, alkylcycloalkyl, etc.

(c) Meno and bicyclic aromatic radicals such as aryl alkaryl, haloaryl, etc.

(d) Heterocyclic radicals containing N, O or S and substituted derivatives thereof such as pyridyl, benzothiazyl, furyl, quinolyl, thiazolyl, etc.

Preferably Z is an aliphatic radical of at least 8 carbon atoms or an aromatic radical of the benzene or naphthalene series.

Preferably Ar, Ar′ and Z are devoid of chromophoric and protonic acid substituents but may contain, for example, alkyl, alkoxy, halogen, lower-alkylamino, carboalkoxy and acylamino substituents.

The novel compounds of the invention can be prepared by heating, e.g. at about 80 to 150° C. an organic thiol or dithiol with about a stoichiometric equivalent of a 4,4'-bis(dialkylamino)benzhydrol (i.e. about one mole of the hydrol per mole of thio-compound per mercapto radical present in the thio compound). Advantageously, the reaction is effected in an inert water-immiscible organic solvent, e.g. benzene or toluene, and water evolved in the reaction is continuously removed from the reaction zone, e.g. by azeotropic distillation with the reaction solvent. The thioether product is readily recovered in a conventional manner, for example, by cooling the reaction mixture to ambient or lower temperature and collecting the precipitated product by filtration.

Alternatively and advantageously the novel compounds of the invention are prepared at ambient temperature by a procedure analogous to that employed in preparing 4,4'-bis(dialkylamino) benzhydryl sulfinates in the above-mentioned U.S. Patent 3,193,404, i.e., by condensing the thiol or dithiol with about a stoichiometric equivalent of the hydrol dissolved in an acidic water-soluble polar organic solvent, e.g. in a lower aliphatic alcohol containing about 1 to 5 weight percent mineral acid such as hydrochloric acid, or more conveniently in a lower monocarboxylic aliphatic acid such as glacial acetic acid.

The following are illustrative of 4,4'-bis(dialkylamino) benzhydrols and substituted 4,4'-bis(dialkylamino) benzhydrols which are suitable for use in preparing the novel chromogenic compounds of the invention:

4,4'-bis(dimethylamino)benzhydrol (Michler's hydrol)
4,4'-bis(diethylamino)benzhydrol
4,4'-bis(dibutylamino)benzhydrol
4,4'-bis(dimethylamino)-2,2'dichloro benzhydrol
4,4'-bis(dimethylamino) 3,3'dimethyl benzhydrol
4,4'-bis(diethylamino) 2,2'dibromo benzhydrol
4,4'-bis(dimethylamino) 2,2'dimethoxybenzhydrol
4,4'-bis(dimethylamino)-2,2',6,6'tetrachloro benzhydrol Preferably a 4,4'-bis(dialkylamino)benzhydrol in which the N-alkyl groups are methyl or ethyl is employed. Use of 4,4'-bis(dimethylamino)benzhydrol gives an especially good result.

Representative organic thiols and dithiols which can be employed in preparing the novel compounds of the invention include the following typical examples:

ALIPHATIC THIOLS AND DITHIOLS

Ethanethiol
2-propanethiol
n-Octanethiol
2-methylpropanethiol
n-Dodecanethiol
n-Octadecanethiol
1,2-ethanedithiol
1,8-octanedithol
1,12-dodecanedithiol
2-octanethiol
2-ethoxyethanethiol
2-phenoxyethanethiol
Methyl-4-mercapto-2,3-dimethyl butyrate
2-diethylaminoethanethiol

CYCLOALIPHATIC THIOLS AND DITHIOLS 4-chlorocyclohexanethiol
Cyclohexanethiol
Cyclooctanethiol
Cyclopropanethiol
Cyclopentanethiol
1,4-cyclohexanedithiol
1,3-cyclopentanedithiol

AROMATIC THIOLS AND DITHIOLS

Benzenethiol
2-naphthalenethiol
p-Toluenethiol
1,2-benzenedithiol
4-chlorobenzenethiol
3-trifluoromethylbenzenethiol
3-mercaptomethylbenzoate
1,4-benzenedithiol
4-nonylbenzenethiol
4-dodecylbenzenethiol
4-tert-butyl-o-toluenethiol

ARALKYL THIOLS AND DITHIOLS

Benzene 1,4-bis(methanethiol)
2-naphthalenemethanethiol benzenemethanethiol
4-mercaptobenzenemethanethiol
4-methoxybenzenemethanethiol
4-chlorobenzenemethanethiol

HETEROCYCLIC THIOLS AND DITHIOLS 2-pyridinethiol
2-benzothiazolethiol
2-furanemethanethiol
8-quinolinethiol
2-thiazolethiol
2,6-benzothiazoledithiol Preferably, a mono thiol is employed, especially an aliphatic thiol of at least eight carbon atoms or an aromatic thiol of the benzene or naphthalene series. Use of an alkylbenzenethiol gives a particularly good result.

The novel thioethers of the invention are covalent compounds, which rapidly or instantaneously generate excellent fast blue colorations when contacted with acidic electron-acceptor materials, such as acidic clays (for example, attapulgite, halloysite, kaolin and bentonite), Lewis acids (for example, zinc chloride, aluminum chloride and zeolite materials), organic acids (for example, gallic acid, $\beta$-resorcyclic acid, and succinic acid), and heteropolyacids (for example phosphotungstic acid, phosphomolybdic acid and phosphotungstomolybdic acid). The new chromogenic compounds are particularly useful in pressure sensitive reproducing and duplicating systems but can also be employed in thermally sensitive compositions, e.g. in thermally sensitive copy paper for thermographic reproduction systems such as the well known "Thermofax" copying system and in electrographic recording compositions, e.g. of the type disclosed in U.S. patent application Ser. No. 499,008, filed Oct. 20, 1965. The new chromogenic compounds do not generate color when contacted with water and hence do not stain textile fabrics, such as cotton, Orlon and nylon-6,6, in the presence or absence of water. The present novel compounds remain substantially colorless when dissolved in aqueous non acidic, polar organic solvents, such as aqueous ethyl alcohol and acetone, permitting their use in pressure sensitive, thermographic, and electrographic duplicating media and compositions which require the use of a substantially colorless, aqueous organic solution of the color precursor. Moreover, anhydrous solutions of the present novel thioethers in ethyl alcohol, and other water-miscible polar non-acidic organic solvents do not stain textile fabrics such as cotton, which, when dry, retain considerable moisture within their fibers.

In the following examples which serve to illustrate our invention, parts and percentages unless otherwise noted are by weight and temperatures are in degrees centigrade.

EXAMPLE 1

A mixture of 54 parts (0.2 mole) of 4,4'-bis(dimethylamino)benzhydrol, 22 parts (0.2 mole) of benzenethiol and 130 parts of toluene is refluxed for eight hours in a reaction vessel equipped with a condenser and a Dean-Stark trap. The water (3.3 parts) produced in reaction is continuously removed from the reaction mixture by azeotropic distillation with toluene which is continuously separated from the distillate and returned to the refluxing mixture. The reaction mass is cooled to ambient temperature and filtered.

The colorless crystalline solid which is collected is washed with 36.3 parts of Skellysolve C (a highly refined petroleum hydrocarbon fraction boiling at about 88–98° C.) and recrystallized from 174 parts of toluene using 1 part of Nuchar (a commercially available activated carbon of vegetable origin) to clarify the recrystallization mass. The recrystallized product is washed with 50.8 parts of Skellysolve C and dried under a stream of air at ambient temperature for two hours. There is thus obtained 50.2 parts (72.4% of theory) of the chromogenic thioether, 4,4′-(phenyl thiomethylene)-bis-(N,N′-dimethylaniline) M.P. 153.8–154.8° corresponding to the structural formula:

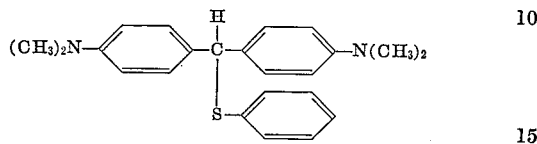

The above thioether provides an excellent blue color when contacted with electron-acceptor acidic material as described in Example 8 below.

EXAMPLES 2–5

In several examples a procedure analogous to that employed in Example 1 is used to prepare the thioethers listed in the table below. These new thioethers give excellent bluish colorations when contacted with electron-acceptor acidic material as described in Example 8 below.

The following Examples 6–8 illustrate the preparation of the novel thioethers of the invention in acidic medium.

EXAMPLE 6

Over a period of about ten minutes, 11 parts (0.1 mole) of the thiol of Example 1 is charged to an agitated solution of 27 parts (0.1 mole) of the 4,4′-bis(dialkylamino) benzhydrol of Example 1 in 136 parts glacial acetic acid. The resulting light blue reaction mass is agitated at ambient temperature for 30 minutes and drowned in 2000 parts of water at ambient temperature. The drowned mass is agitated for 15 minutes at ambient temperature and filtered.

The light tan solid which is collected is washed with 96 parts of about 10% aqueous ammonia, then with water and dried in vacuo at 50°. There is thus obtained a quantitative yield (36.1 parts) of the thioether of Example 1.

EXAMPLE 7

To a solution of 27 parts (0.1 mole) of the 4,4′-bis(dialkylamino) benzhydrol of Example 1 in 158 parts of glacial acetic acid is charged 14.6 parts (0.1 mole) of the thiol of Example 4. The mixture is agitated at ambient temperature for about 16 hours, and drowned in 180 parts of 11% aqueous ammonia at 0–5°. The drowned mass is agitated for one hour at ambient temperature and filtered. The recovered solid is recrystallized from 298 parts of 66% aqueous alcohol using 1 part of activated carbon to clarify the recrystallization mixture. The recrystallized product is washed with 147 parts of 50% aqueous alcohol and dried in vacuo at 45–50° to give 34.6 parts (87% of theory) of the thioether of Example 4, M.P. 37.8–39°.

EXAMPLE 8

A slurry of 8.5 parts (0.05 mole) of 2-diethylaminoethanethiol hydrochloride in 16 parts of ethyl alcohol is charged to a mixture of 13.5 parts (0.05 mole) of the 4,4′-bis-(dialkylamino)benzhydrol of Example 1, 5.8 parts of 20° Bé. aqueous hydrochloric acid (corresponding to 1.83 parts hydrogen chloride) and 95 parts of ethyl alcohol at ambient temperature. The pale green mixture is agitated for one hour at ambient temperature and drowned in a mixture of 44.9 parts of 26° Bé. aqueous ammonia, 50 parts of water and 200 parts of ice. The drowned mass is agitated for about 30 minutes and extracted with 71 parts of diethyl ether. The ether in the extract is removed by evaporation at 95° to give 8.8

TABLE

| Example | 4,4′-Bis(dialkylamino)benzhydrol Charged | Thiol charged | Thioether product | Yield |
|---|---|---|---|---|
| 2 | As in Example 1 (28.4 parts of 95% 4,4′-bis(dimethylamino)benzhydrol, 0.1 mole). | 2-naphthalenethiol (16 parts, 0.1 mole) | (CH₃)₂N—⌬—CH—S—naphthyl (M.P. 159.8–161.0°) | 31.7 parts (76% of theory). |
| 3 | ....do.... | Benzylthiol (12.4 parts, 0.1 mole) | (CH₃)₂N—⌬—CH—S—CH₂—phenyl (M.P. 95–95.8°) | 21.8 parts (58% of theory). |
| 4 | As in Example 1 (27 parts of 100%, 4,4′-bis(dimethylamino)benzhydrol, 0.1 mole). | n-Octylthiol (14.6 parts, 0.1 mole) | (CH₃)₂N—⌬—CH—S—CH₂(CH₂)₆CH₃ | |
| 5 | As in Example 1 (14.7 parts of 95%, 4,4′-bis(dimethylamino)benzhydrol, 0.05 mole). | 4-tert-butyl-o-toluenethiol (9 parts, 0.05 mole) | (CH₃)₂N—⌬—CH—S—tolyl—C(CH₃)₃ (M.P. 121–122.2°) | 15.5 parts (72% of theory). | parts (51% of theory) of an oil corresponding to the structure:

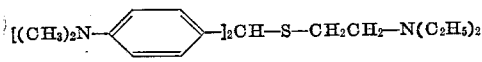

EXAMPLE 9

Colorless 1% solutions in toluene of the chromogenic thioethers of Examples 1, 2, 3, 4 and 8 are each contacted with paper samples impregnated with attapulgite clay (commercially available as Attasorb RVM). The samples develop excellent blue colorations immediately.

The following example illustrates the use of the novel chromogenic thioethers of the invention in thermographic copy paper.

EXAMPLE 10

A mixture of 2 parts of the chromogenic thioether of Example 1, 1 part gallic acid, 1 part of titanium dioxide and 13 parts of toluene is ground for 16 hours with 5 parts of Ottawa sand and sieved through a screen having 200 meshes per inch. After addition of 15 parts by volume of a 10% toluene solution of ethyl cellulose N-10. The mixture is coated on a 9 x 12 inch sheet of tracing paper with a No. 20 Mayer rod (a commercially available wire-wound rod). The coated paper is dried in air at ambient temperature. The uncoated side of the resulting copy sheet is placed against a printed page and exposed to infrared radiation in a "Secretary" model Thermo-Fax Copy Machine operated at a temperature-speed differential setting of 6. An excellent violet reproduction of the printed page against a substantially colorless background is obtained on the copy sheet. The colorless portions of the copy sheet are not colored by exposure to sunlight for 20 hours.

The following examples illustrate use of the novel chromogenic thioethers of the invention in pressure-sensitive transfer paper.

EXAMPLE 11

To 40 parts of a solution, prepared by dissolving 5 parts of the chromogenic thioether of Example 1 in 100 parts by volume of dioctyl phthalate at 45–50° and subsequently filtering the solution, is charged 60 parts of a solution prepared by dissolving 25 parts of gelatin powder in 100 parts of water at 50–60° and subsequently adjusting the pH of the solution to 9 by addition of 50° Bé. aqueous sodium hydroxide. The mixture is agitated in a Waring Blendor for 30 seconds, coated on tracing paper using a No. 6 Mayer rod and dried in air. The coated side of the resulting transfer paper is placed against the attapulgite-coated side of a paper receiving surface. When the uncoated side of the transfer paper is inscribed, the writing is reproduced in an excellent bluish-violet shade on the receiving surface within 1 to 2 seconds.

EXAMPLE 12

The procedure of Example 11 is repeated as described except that 40 parts of a solution of 4 parts of the chromogenic thioether of Example 2 in 100 parts by volume of dioctylphthalate are used in preparing a pressure sensitive transfer paper. When the resulting transfer paper is tested as described in Example 11, excellent bluish-violet reproduction of writing on the receiving surface is obtained in about 3 seconds.

EXAMPLE 13

The procedure of Example 12 is repeated as described except that 40 parts of a solution of 2.5 parts of the chromogenic thioether of Example 3 in 50 parts by volume of dioctyl phthalate are used in preparing a pressure-sensitive transfer paper. When the resulting transfer paper is tested as described in Example 11, an excellent bluish-violet reproduction of writing on the receiving surface is obtained in about 15 seconds.

The following example illustrates the inertness of chromogenic thioethers of the present invention towards aqueous organic solvents.

EXAMPLE 14

Part A

Water is added gradually to an agitated solution of 0.03 part of the thioether of Example 4 in about 15.8 parts of anhydrous ethyl alcohol. The mixture remains substantially colorless until the thioether percipitates as white solid after addition of about 13 parts of water.

Part B

The procedure of Part A is repeated as described except that a solution of 0.03 part of 4,4'-bis(dimethylamino) benzhydrol p-toluenesulfinate (U.S.P. 3,193,404) in about 15.8 parts of anhydrous ethyl alcohol is employed. After addition of about 5 parts of water the solution develops a blue color which is intensified on further addition of water.

The following example illustrates the non-staining property of the novel electron-donor chromogenic thioethers of the invention.

EXAMPLE 15

One square inch swatches of cotton, polyhexamethylene adipamide (nylon-6,6) and polyacrylonitrile (Orlon) are moistened with water and contacted with 0.01–0.02 part of the chromogenic thioether of Example 1. The treated fabric samples remain colorless after standing in the presence of water for twenty-four hours.

The foregoing procedure is repeated as described except that the wet fabric samples are contacted with 0.01–0.02 part of the methylether of 4,4' - bis - (dimethylamino) benzhydrol (Michler's hydrol). On addition of the latter compound each fabric sample develops immediately an intense blue stain.

It will be evident that the invention is not limited to the details of the foregoing illustrative examples and that changes can be made without departing from the scope of the invention.

We claim:

1. An electron-donor chromogenic compound having the general structure

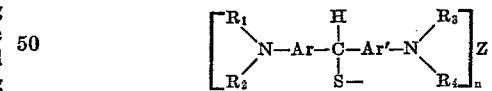

wherein $R_1$, $R_2$, $R_3$ and $R_4$ are lower alkyl groups; Ar and Ar' are aryl groups devoid of chromophoric and protonic acid substituents selected from the group consisting of 1,4-phenylene and methyl-, methoxy-, bromo-, or chloro-substituted derivatives thereof; $n$ is the valence of Z and is an integer of 1 or 2, Z is an organic radical devoid of chromophoric and protonic acid substituents which is the residue of an organic thiol, said radical being selected from the group consisting of alkyl, cycloalkyl, mono or bicyclic aryl groups, there being no more than one bis-(p-dialkylaminoaryl)methyl group for each sulfur atom.

2. The compound of claim 1 wherein $R_1$, $R_2$, $R_3$ and $R_4$ are methyl.

3. The compound of claim 1 wherein $R_1$, $R_2$, $R_3$ and $R_4$ are ethyl.

4. The compound of claim 1 wherein Ar and Ar' are 1,4-phenylene.

5. The compound of claim 1 wherein Ar and Ar' are methyl-, methoxy-, bromo-, or chloro-substituted derivatives of the 1,4-phenylene group.

6. The compound of claim 1 wherein Z is an alkyl radical having 8 carbon atoms.

7. The compound of claim 1 where Z is phenyl or naphthyl.

8. The compound of claim 1 wherein Z is benzyl.

9. The compound 4,4' - (phenylthiomethylene) - bis-(N,N-dimethylaniline).

10. The compound 4,4'-(naphthylthiomethylene)-bis-(N,N-dimethylaniline).

11. The compound 4,4' - (octylthiomethylene) - bis-(N,N-dimethylaniline).

12. The compound 4,4'(2 - diethylamino ethylthiomethylene)-bis(N,N-dimethylaniline).

13. The compound 4,4'[(4 - t.-butyl-2-methylphenyl)thiomethylene]bis(N,N-dimethylamine).

References Cited

UNITED STATES PATENTS 2,505,484  4/1950  Green _____ 260—570 X
3,193,404  7/1965  Davis _____ 260—570 X CHARLES B. PARKER, Primary Examiner S. T. LAWRENCE III, Assistant Examiner U.S. Cl. X.R.

117—36.7, 36.8, 157; 260—287, 288, 294.8, 302, 306, 306.6, 346.1, 470, 562

PO-1050
(5/69)

UNITED STATES PATENT OFFICE
CERTIFICATE OF CORRECTION

Patent No. 3,489,800        Dated January 13, 1970

Inventor(s) Floyd L. Tewksbury, Raymond B. Crawford and Audley L. Cain

It is certified that error appears in the above-identified patent and that said Letters Patent are hereby corrected as shown below:

Column 2, line 5, "anhydrus" should be --anhydrous--.

Column 6, Example 4, that part of the formula reading "$[(CH_3)N_2$" should be --$[(CH_3)_2N$--.

Claim 13, line 2, that part of the formula reading "(N,N-dimethylamine)" should be --(N,N-dimethylaniline)--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents